(12) United States Patent
Lee et al.

(10) Patent No.: US 9,323,845 B2
(45) Date of Patent: Apr. 26, 2016

(54) PORTABLE COMMUNICATION TERMINAL FOR EXTRACTING SUBJECTS OF INTEREST TO THE USER, AND A METHOD THEREFOR

(75) Inventors: Sang Keun Lee, Seoul (KR); Jong Woo Ha, Seoul (KR); Jung Hyun Lee, Seoul (KR)

(73) Assignee: KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 916 days.

(21) Appl. No.: 13/577,149

(22) PCT Filed: Jan. 31, 2011

(86) PCT No.: PCT/KR2011/000663
§ 371 (c)(1),
(2), (4) Date: Dec. 3, 2012

(87) PCT Pub. No.: WO2011/096690
PCT Pub. Date: Aug. 11, 2011

(65) Prior Publication Data
US 2013/0073569 A1    Mar. 21, 2013

(30) Foreign Application Priority Data
Feb. 3, 2010   (KR) ......................... 10-2010-0010078

(51) Int. Cl.
*G06F 17/30*   (2006.01)
*G06K 9/62*    (2006.01)
*G06Q 30/02*   (2012.01)

(52) U.S. Cl.
CPC .... *G06F 17/30864* (2013.01); *G06F 17/30595* (2013.01); *G06F 17/30707* (2013.01); *G06K 9/6282* (2013.01); *G06Q 30/02* (2013.01)

(58) Field of Classification Search
CPC ................... G06F 17/30864; G06F 17/30595; G06F 17/30707
USPC ........................................................ 707/749
See application file for complete search history.

(56) References Cited

U.S. PATENT DOCUMENTS

| 2003/0074409 | A1 | 4/2003 | Bentley |
| 2005/0216516 | A1 | 9/2005 | Calistri-Yeh et al. |
| 2011/0076653 | A1* | 3/2011 | Culligan ................ G09B 19/06 434/157 |

FOREIGN PATENT DOCUMENTS

| KR | 10-2008-0020011 A | 3/2009 |
| KR | 10-2009-0108530 A | 10/2009 |

OTHER PUBLICATIONS

Machine Translation of Korean Patent Publication No. 1020080020011, D3, issued to Joong Min Choi et al.., Publication date: Mar. 5, 2008.*

(Continued)

*Primary Examiner* — Shahid Alam
(74) *Attorney, Agent, or Firm* — McDermott Will & Emery LLP

(57) ABSTRACT

A portable communication device for extracting a user interest comprises a term vector generation unit for generating, based on types of text data stored in the portable communication device, a term vector representing each text data, a subject classification tree storage unit for storing a subject classification tree, which is a tree structure in which multiple nodes, each including at least one training data and representing a subject, are connected to one another, and a similarity calculation unit for calculating a similarity between the term vector and the training data for each node in the subject classification tree. The similarity calculation unit extracts a node name representing the user interest from the subject classification tree based on the similarity.

8 Claims, 14 Drawing Sheets

(56) References Cited

OTHER PUBLICATIONS

Machine Translation of Korean Patent Publication No. 1020090108530, D2, issued to Hyo Jung Oh et al., Publication date: Oct. 15, 2009.*

Yoonjung Choi et al. Topic and Topic Change Detection in INstance meeasging:, Journal of the Korea Society of Computer and Information, Dec. 2008, vol. 12 No. 17, pp. 59-66 (with English abstract).

International Search Report dated Sep. 30, 2011 issued in corresponding International Application No. PCT/KR2011/000663.

Supplemental European Search Report dated Oct. 21, 2015 in Application No. 11739986.5.

Ahu Sieg et al.: "Web Search Personalization with Ontological User Profiles", Proceedings of the Sixteenth ACM conference on Information and Knowledge Management, CIKM 07, Jan. 1, 2007, pp. 525-534.

Susan Gauch et al., "User Profiles for Personalized Information Access", Apr. 24, 2007, The Adaptive Web; pp. 54-89.

Joana Trajkova et al. "Improving Ontology-Based User Profiles", Proceedings of RIAO 2004, pp. 380-390.

* cited by examiner

FIG. 6

*Input : root directory $D_{root}$ in ODP*
*Ouput : merge centroid vectors for each directory in ODP*
*Algorithm : merge_cent roid($D_i$)*
1 : $\vec{c_i} \leftarrow centroid(D_i)$
2 : $if(|child(D_i)| = 0)$
3 :     $\vec{mc_i} \leftarrow \vec{c_i}$
4 :     $return \; \vec{c_i}$
5 : else
6 :     $\vec{mc_i} \leftarrow \vec{c_i}/\|\vec{c_i}\|$
7 :     $for(\vec{c_j} \in child(D_i))$
8 :         $\vec{mc_j} \leftarrow merge\_centroid(D_j)$
9 :         $\vec{mc_i} \leftarrow \vec{mc_i} + \vec{mc_j}/\|\vec{mc_j}\|$
10 :    $return \; \vec{mc_i}/1 + |child(D_i)|$

FIG. 8

$d = A$ input page vector or ad vector $C = A$ set of class in taxonomy $\overrightarrow{mc_i} = A$ merge centroid vector of class $c_i$ $$class(d) = \arg\max_{c_i \in C} \frac{\overrightarrow{mc_i}}{\|\overrightarrow{mc_i}\|} \cdot \frac{\vec{d}}{\|\vec{d}\|}$$

PORTABLE COMMUNICATION TERMINAL FOR EXTRACTING SUBJECTS OF INTEREST TO THE USER, AND A METHOD THEREFOR

RELATED APPLICATIONS

This application is the U.S. National Phase under 35 U.S.C. §371 of International Application No. PCT/KR2011/000663, filed on Jan. 31, 2011, which in turn claims the benefit of Korean Application No. 10-2010-0010078, filed on Feb. 2, 2010, the disclosures of which Applications are incorporated by reference herein.

TECHNICAL FIELD

The present disclosure relates to a portable communication device and a method for extracting a user interest.

BACKGROUND ART

In the recent environment for portable communication devices, technologies to provide personalized information services such as news recommendation and customized advertisement have been developed. In order to provide such personalized information service, it is necessary to obtain interests of a user.

A commonly used method of obtaining interests of a user relates to receiving a direct input from the user. For example, interests of a user may be acquired through a GUI providing the user with topics of interest list, or by letting the user directly specify his/her own words.

However, the conventional method has problems including that it is difficult to obtain interests of a user if the user does not actively respond to the UI in inconvenient environments to input information such as a portable communication device.

One way to automatically obtain interests of a user is automatically extracting search keywords of the user through a software installed on the user's device and regarding the extracted keywords as the interests of the user.

However, since this kind of conventional methods transmit all the search keywords of the user to a server, security concerns may be raised during the transmission. Furthermore, since these conventional technologies mainly target only at the search keywords of the user, their scope and targets of extraction in obtaining interests of the user are limited.

DISCLOSURE OF THE INVENTION

Problems to be Solved by the Invention

An illustrative embodiment of the present disclosure provides a portable communication device for extracting a user interest, the device capable of obtaining a user interest by using text data included in data generated in the portable communication device, so as to exactly extract the user interest without requiring the user to explicitly input data for his/her interest.

An illustrative embodiment of the present disclosure provides a portable communication device for extracting a user interest, the device capable of outputting the user interest as a node name of a subject classification tree generated by processing open directory data, providing security for the user interests.

An illustrative embodiment of the present disclosure provides a portable communication device for extracting a user interest, the device capable of obtaining a super ordinate concept of the user interest by virtue of a feature of a subject classification tree.

Means for Solving the Problems

In accordance with an illustrative configuration, a portable communication device for extracting a user interest, the device includes a term vector generation unit for generating, based on types of text data stored in the portable communication device, a term vector representing each text data, a subject classification tree storage unit for storing a subject classification tree, which is a tree structure in which multiple nodes, each including at least one training data and representing a subject, are connected to one another, and a similarity calculation unit for calculating a similarity between the term vector and the training data for each node in the subject classification tree. The similarity calculation unit extracts a node name representing the user interest from the subject classification tree based on the similarity.

In accordance with an illustrative configuration, a method for extracting a user interest, the method includes a step in which a term extraction unit extracts terms from text data stored in a portable communication device, a step in which a term weight calculation unit calculates a term weight based on usage frequency of each of the terms used in the text data, and generation time of the text data containing the terms, a step in which a term vector generation unit, based on types of text data stored in the portable communication device, generates a term vector representing each text data, and a step in which a similarity calculation unit calculates a similarity between the term vector and the training data for each node included in a subject classification tree, which is a tree structure in which multiple nodes, each including at least one training data and representing a subject, are connected to one another. The similarity calculation unit extracts a node name representing the user interest from the subject classification tree based on the calculated similarity.

Effect of the Invention

In accordance with the technical means to solve the above-described problems, it is possible to exactly extract a user interest without requiring the user to explicitly input his/her interest. This is because the user interest is obtained by using text data included in data generated in a portable communication device.

Furthermore, since not only user input texts, but all data expressed in a form of text such as a web page accessed by the user, a title and explanation notes of a TV show viewed by the user, and an e-mail inbox are analyzed, the present disclosure can be applied even in the case where the user uses a web service via an IP-TV.

In accordance with the technical means to solve the above-described problems, it is possible to provide security for the user interests. This is because the user interest is output by using a node name of a subject classification tree generated by processing open directory data.

Also, it is possible to obtain a super ordinate concept of the user interest by virtue of a feature of a subject classification tree.

BRIEF DESCRIPTION OF THE DRAWINGS

FIG. 6 shows a mathematical expression of an algorithm related to the step for generating training data in accordance with an illustrative embodiment of the present disclosure;

FIG. 8 shows a mathematical expression of an algorithm related to the configuration of a classification unit in accordance with an illustrative embodiment of the present disclosure;

BEST MODE FOR CARRYING OUT THE INVENTION

Figure 1:
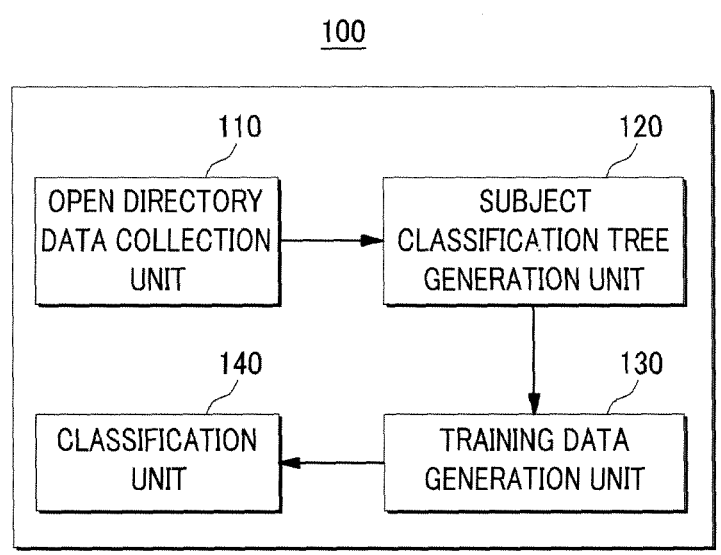
FIG. 1 is a block diagram of a subject classification tree in accordance with an illustrative embodiment of the present disclosure.

Hereinafter, illustrative embodiments will be described in detail with reference to the accompanying drawings so that inventive concept may be readily implemented by those skilled in the art. However, it is to be noted that the present disclosure is not limited to the illustrative embodiments but can be realized in various other ways. In the drawings, certain parts not directly relevant to the description are omitted to enhance the clarity of the drawings, and like reference numerals denote like parts throughout the whole document.

Throughout the whole document, the terms "connected to" or "coupled to" are used to designate a connection or coupling of one element to another element and include both a case where an element is "directly connected or coupled to" another element and a case where an element is "electronically connected or coupled to" another element via still another element. Further, the term "comprises or includes" and/or "comprising or including" used in the document means that one or more other components, steps, operations, and/or the existence or addition of elements are not excluded in addition to the described components, steps, operations and/or elements.

FIG. 1 is a block diagram of a subject classification tree apparatus in accordance with an illustrative embodiment of the present disclosure.

As illustrated in FIG. 1, a subject classification tree apparatus 100 includes an open directory data collection unit 110, a subject classification tree generation unit 120, a training data generation unit 130, and a classification unit 140. The subject classification tree apparatus 100 may operate in cooperation with a portable communication device 200 that extracts a user interest, which will be described later with reference to FIG. 9, or include components of the portable communication device 200 that extracts a user interest.

The open directory data collection unit 110 collects various open directories and information about web pages included in each of the directories. For example, the open directory data collection unit 110 mines the open directory project (ODP; http://www.dmoz.org/) data or different open directory data posted on various portal sites.

The open directory project is one of the most comprehensive web directories that is edited manually. The open directory project has been constructed and is managed by a global resource edition community. The open directory project data include a directory structure for classifying web sites and a list of manually classified web sites included in each directory.

The subject classification tree generation unit 120 generates a subject classification tree by processing a set of open directory data. Since open directory data include not only directories indicating real-world concepts and subjects, but also directories merely for providing dictionary-like classification, the subject classification tree generation unit 120 can generate a subject classification tree by removing these directories when generating the classification tree.

The subject classification tree generation unit 120 may select directories indicating concepts and subjects suitable for representing user interests to generate a subject classification tree. In an illustrative embodiment of the present disclosure, in order to generate a subject classification tree, the following four filtering steps may be performed.

In the first step, among all directories of open directory data, directories that do not indicate any subjects are removed. For example, "world" and "regional" directories that are duplicated with other directories and are provided in various languages may be removed from the top directory.

Here, the "world" directory's sub directories that correspond to the target language of the subject classification tree may be selected to be left. Also, intermediate directories that simply use alphabets (A, B, or numerals (1, 2, 3 . . . ) as their directory names may be removed and their sub directories may be connected to their parent directories. Further, leaf directories that do not represent any specific subjects and are frequently repeated in directories may be removed.

In the second step, among the directories included in the open directory data, directories that include fewer web pages than a threshold value may be removed.

Figure 2:
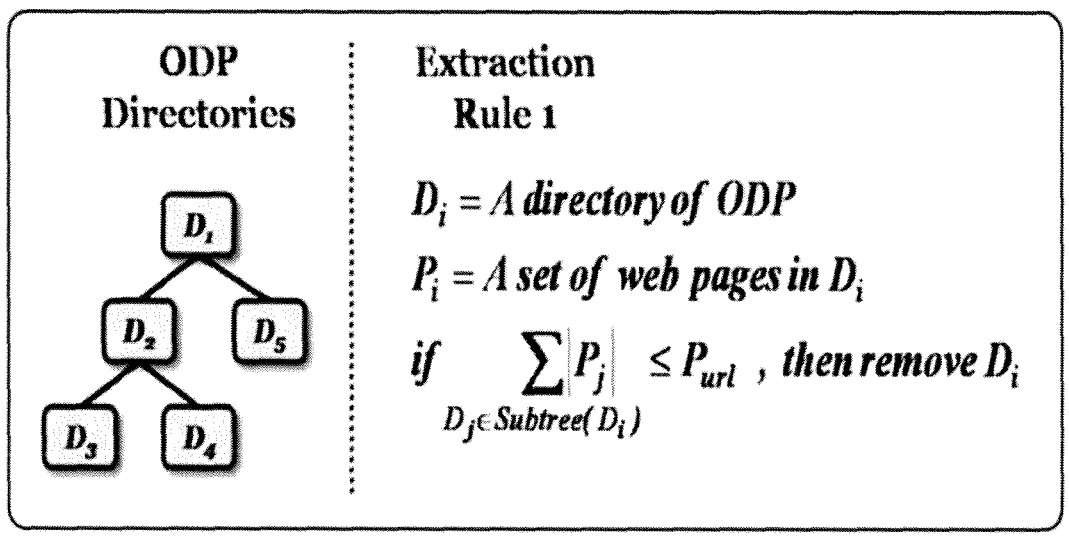
FIG. 2 shows a mathematical expression of an algorithm related to the method for processing open directory data in accordance with an illustrative embodiment of the present disclosure.

FIG. 2 shows a mathematical expression of an algorithm related to the method for processing open directory data in accordance with an illustrative embodiment of the present disclosure.

As illustrated in FIG. 2, if the number (Pi) of web pages included in each directory (Di) is smaller than a threshold value (Purl), the subject classification tree generation unit 120 may remove the corresponding directory.

In the third step, subjects that provide a proper level of generality and concreteness are filtered to be left. The subject classification tree generation unit 120 may remove some sub nodes by applying a given depth threshold value (Pdep) to each path down to all leaf nodes of the tree.

Figure 3:
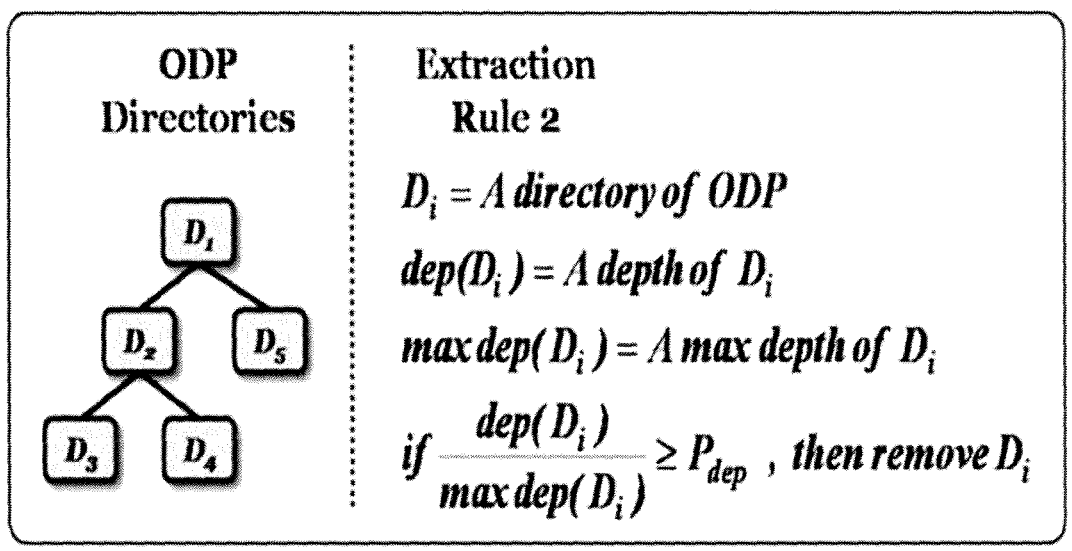
FIG. 3 shows a mathematical expression of an algorithm related to the method for processing open directory data in accordance with an illustrative embodiment of the present disclosure.

FIG. 3 shows a mathematical expression of an algorithm related to the method for processing open directory data in accordance with an illustrative embodiment of the present disclosure.

As described in the formula of FIG. 3, if the proportion of each directory's depth (dep(Di)) to the lowest directory's depth (maxdep(Di)) is larger than the threshold value (Pdep), the subject classification tree generation unit 120 may remove the corresponding directory.

In the example illustrated in FIG. 3, the depth of the directory D2 is 2, and the depth of the lowest directory D3 is 3. If the threshold value (Pdep) is 0.8, dep(D2)/maxdep(D2)=2/3 is smaller than the threshold value (Pdep), so that the corresponding directory D2 will be kept left. However, since dep(D3)/maxdep(D3)=3/3 is larger than the threshold value (Pdep), the corresponding directory D3 may be removed.

In the fourth step, in order to improve accuracy of the extracted user interest by assuring sufficient differences between each subject, a vector space model may be applied to web pages of each directory.

Figure 4:
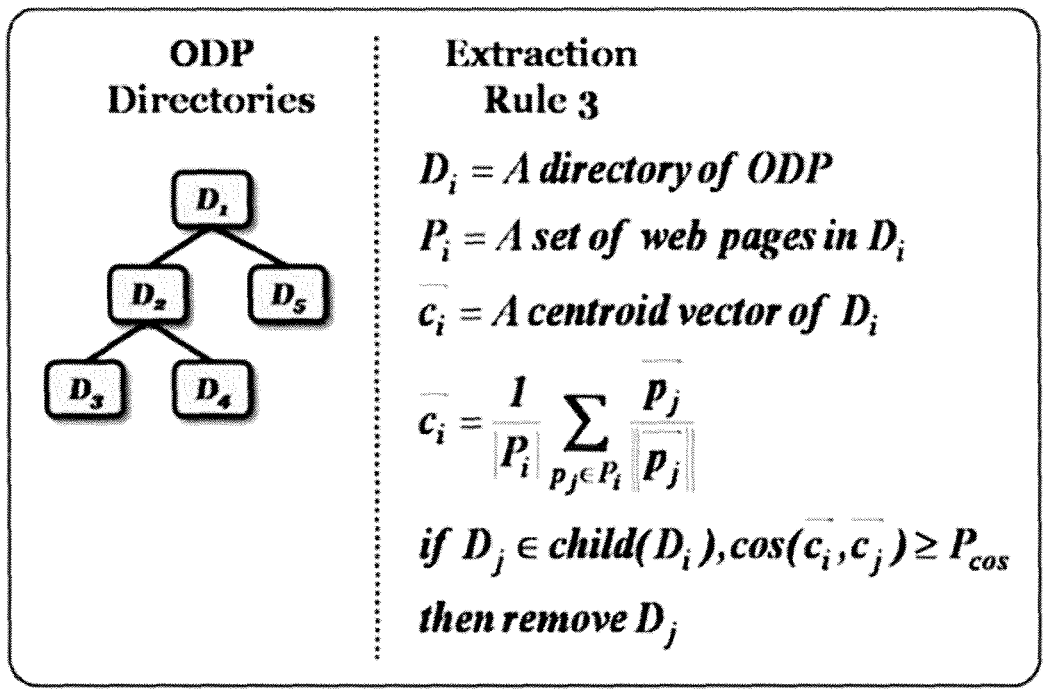
FIG. 4 shows a mathematical expression of an algorithm related to the method for processing open directory data in accordance with an illustrative embodiment of the present disclosure.

FIG. 4 shows a mathematical expression of an algorithm related to the method for processing open directory data in accordance with an illustrative embodiment of the present disclosure.

As described in the formula of FIG. 4, the subject classification tree generation unit 120 first converts information of web pages of each directory into a term vector, and then, based on each of the term vectors, calculates a centroid vector for each directory. Then, the subject classification tree generation unit 120 calculates the cosine similarity between the centroid vectors of a parent directory and its sub directory, and may remove the sub directory if the result is larger than a threshold value. The cosine similarity may be calculated based on Formula I as follows:

$$\text{similarity} = \cos(\theta) = \frac{A \cdot B}{\|A\|\|B\|}. \quad \text{[Formula 1]}$$

The subject classification tree generation unit 120 may remove directories according to the above-described four steps. Now, the subject classification tree generation unit 120 may convert remaining directories into nodes of the subject classification tree.

The subject classification tree generation unit 120 may generate the subject classification tree by setting the name of the node to the name of the directories, and converting a parent-child relation between directories into an edge between nodes. Here, at least one of the steps for filtering directories may be selectively applied.

Figure 5:
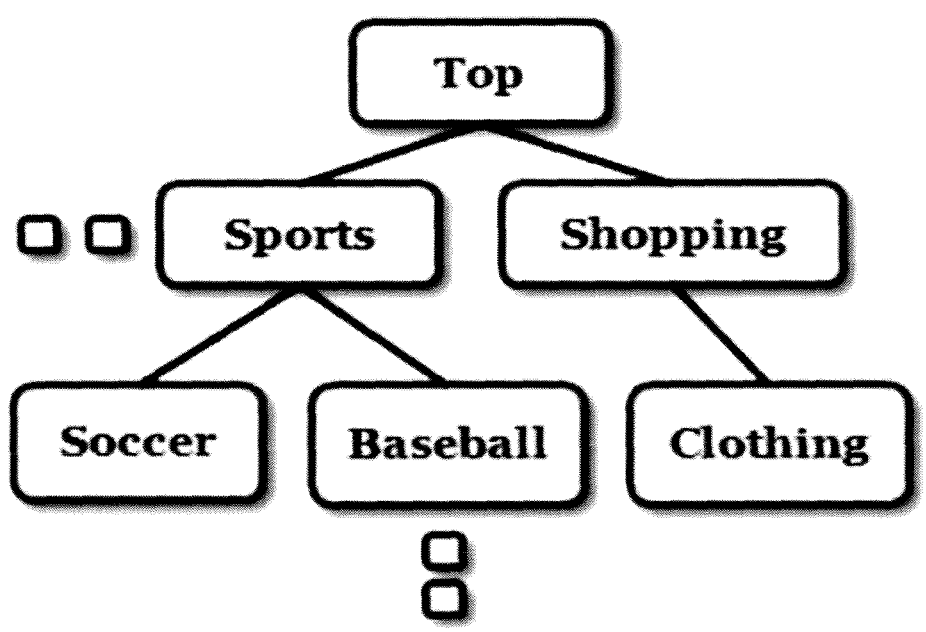
FIG. 5 shows part of a subject classification tree generated by using the directory structure of the open directory project in accordance with an illustrative embodiment of the present disclosure.

FIG. 5 shows part of a subject classification tree generated by using the directory structure of the open directory project in accordance with an illustrative embodiment of the present disclosure.

Directories of the open directory project have a tree structure. The total number of the directories is approximately 590,000. Maximum tree depth is 15 level. The number of top level directories is 16.

As illustrated in FIG. 5, since each of the directories indicates a single real-world concept and subject, the directories may be regarded as user interests so as to generate a subject classification tree.

Here, the subject classification tree generation unit 120 can use the above-described four steps in selecting directories that represent suitable concepts and subjects for the user interests to generate the subject classification tree.

Returning to FIG. 1, the training data generation unit 130 generates training data representing each directory, based on text data information of web sites included in each directory of the open directory data.

Figure 7:
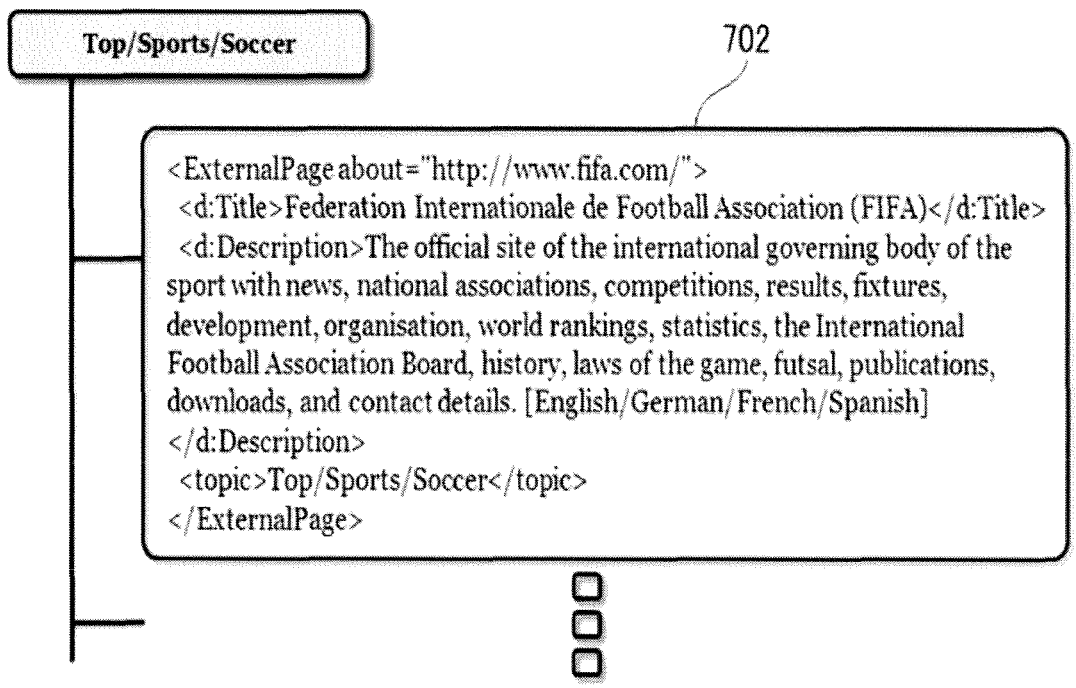
FIG. 7 is a conceptual view of training data generated in each node in accordance with an illustrative embodiment of the present disclosure.

FIG. 6 shows a mathematical expression of an algorithm related to the step for generating training data in accordance with an illustrative embodiment of the present disclosure. FIG. 7 is a conceptual view of training data generated in each node in accordance with an illustrative embodiment of the present disclosure.

The training data generation unit 130 may convert text data of a web page into a term vector, and then, calculate a centroid vector for each directory based on the term vector. Thereafter, the training data generation unit 130 may calculate a merge centroid vector of each parent directory by calculating the vector sum of the centroid vectors of child directories and that of the parent directory, starting from the lowest level directory.

The reason for the calculation of the merge centroid vector is for parent directories to include concepts of its child directories. For this, each parent directory calculates its merge centroid vector by calculating the vector sum of the centroid vectors of its child directories and the centroid vector of itself. FIG. 6 illustrates detailed algorithm in this regard.

Since the text data of each web page include a web site address (URL), a title, and descriptions, the training data generation unit 130 may convert these into a term vector. As illustrated in FIG. 7, the training data generation unit 130 may generate training data by composing a document containing text data 702 including a title and descriptions, and regarding each of the documents as the training data for each node of the subject classification tree. The conversion into term vectors and calculation of centroid vectors may be performed according to the formula of FIG. 4.

Returning FIG. 1, the classification unit 140 maps the generated training data to each directory in the subject classification tree. Here, the classification unit 140 may map the calculated merge centroid vectors to the directories included in the subject classification tree.

FIG. 8 shows a mathematical expression of an algorithm related to the configuration of a classification unit in accordance with an illustrative embodiment of the present disclosure.

The classification unit 140 converts text data of web pages to be classified into term vectors (d) in a vector space model. The classification unit 140 calculates cosine similarities between the term vectors (d) and the merge centroid vectors (mc), representing each of the nodes of the generated subject classification tree, and selects the node (class(d)) having the highest cosine similarity to be the subject of the corresponding web page. Here, the classification unit 140 may include a Roccio classifier in the vector space model.

Using the similarity between the training data, included in the fore-said subject classification tree, and the term vector, representing text data included in data generated in a portable communication device, a user interest may be extracted in the form of a node name of the subject classification tree. More detailed descriptions in this regard will be provided below with reference to FIG. 9.

Figure 9:
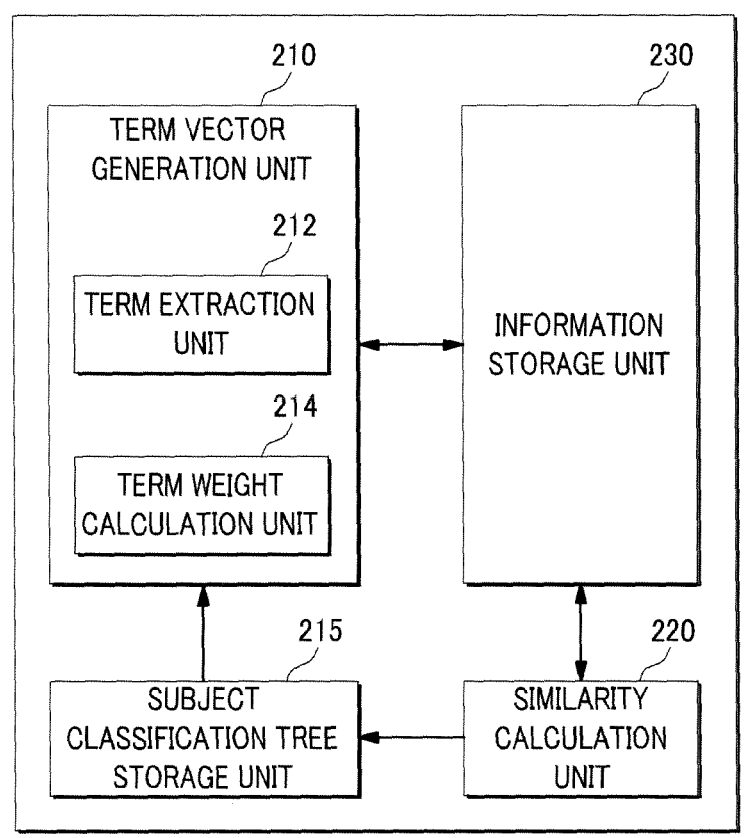
FIG. 9 is a block diagram of a portable communication device that extracts a user interest, in accordance with an illustrative embodiment of the present disclosure.

FIG. 9 is a block diagram of a portable communication device that extracts a user interest in accordance with an illustrative embodiment of the present disclosure.

A portable communication device 200 that extracts a user interest includes a term vector generation unit 210, a subject classification tree storage unit 215, a similarity calculation unit 220, and an information storage unit 230. The portable communication device 200 that extracts a user interest may include the components of FIG. 1 or operate in cooperation with the subject classification tree apparatus 100.

The term vector generation unit 120, based on types of text data stored in a portable communication device, generates a term vector representing each text data. To this end, the term vector generation unit 210 includes a term extraction unit 212 and a term weight calculation unit 214.

The term extraction unit 212 extracts terms from the text data. Here, the text data may be extracted from at least one of a text message, a file name, an e-mail, and a mobile web usage history. That is, the term extraction unit 212 may extract terms from text data generated when a user sends a text message, writes an e-mail, stores a user file, and searches through a web connection.

Figure 10:
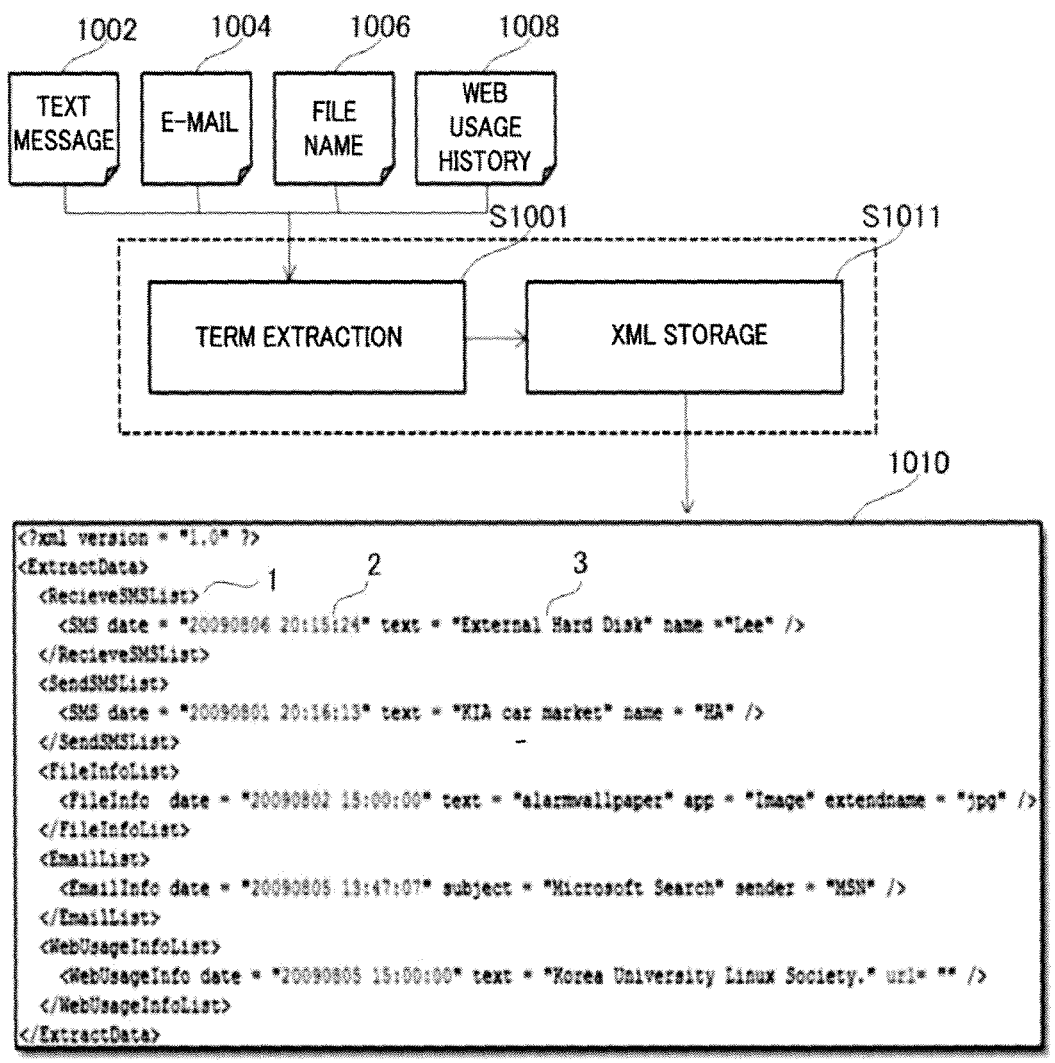
FIG. 10 is a conceptual view showing extracting text data from input data and storing the text data in the XML form in accordance with an illustrative embodiment of the present disclosure.

FIG. 10 is a conceptual view showing extracting text data from input data and storing the text data in the XML form, in accordance with an illustrative embodiment of the present disclosure.

The term extraction unit 212 extracts terms from text data such as a text message 1002, a file name 1004, an e-mail 1006, and a mobile web usage history 1008, which are generated in a portable communication device (S1001). Here, the text data may include meta data as information related to the text data. Specifically, the information related to the text data may include the type of data (e.g., SMS, FILE, EMAIL, etc.) containing the corresponding text data, the generation time and location of the text data, and information of the associated application program, etc.

The term extraction unit 212 may extract terms for text data generated during a pre-designated certain period of time, and may store information related to the text data in the XML file format in the information storage unit 230 (S1011). The XML data 1010 may include a list 1 of types of text, information 3 about the text data, and information 2 about time when the corresponding text data were generated.

Returning to FIG. 9, the term weight calculation unit 214 calculates a term weight based on the usage frequency of each term used in the text data and the generation time of the text data containing the term. For example, if a user mostly uses text messaging, a higher weight may be given to text data in the text message form, compared to other types of text data. Also, since lately generated data may better indicate the user's current interests, a weight may also be assigned to time when the text data containing the corresponding term were generated.

Therefore, the weight calculation unit 214 calculates a term weight based on the usage frequency of each term and the generation time of the text data containing the corresponding term. On this basis, the term vector generation unit 210 may generate a term vector representing each text data based on the text data type. And the term weight calculation unit 214 may further assign a weight depending on the types of text data.

Figure 11:
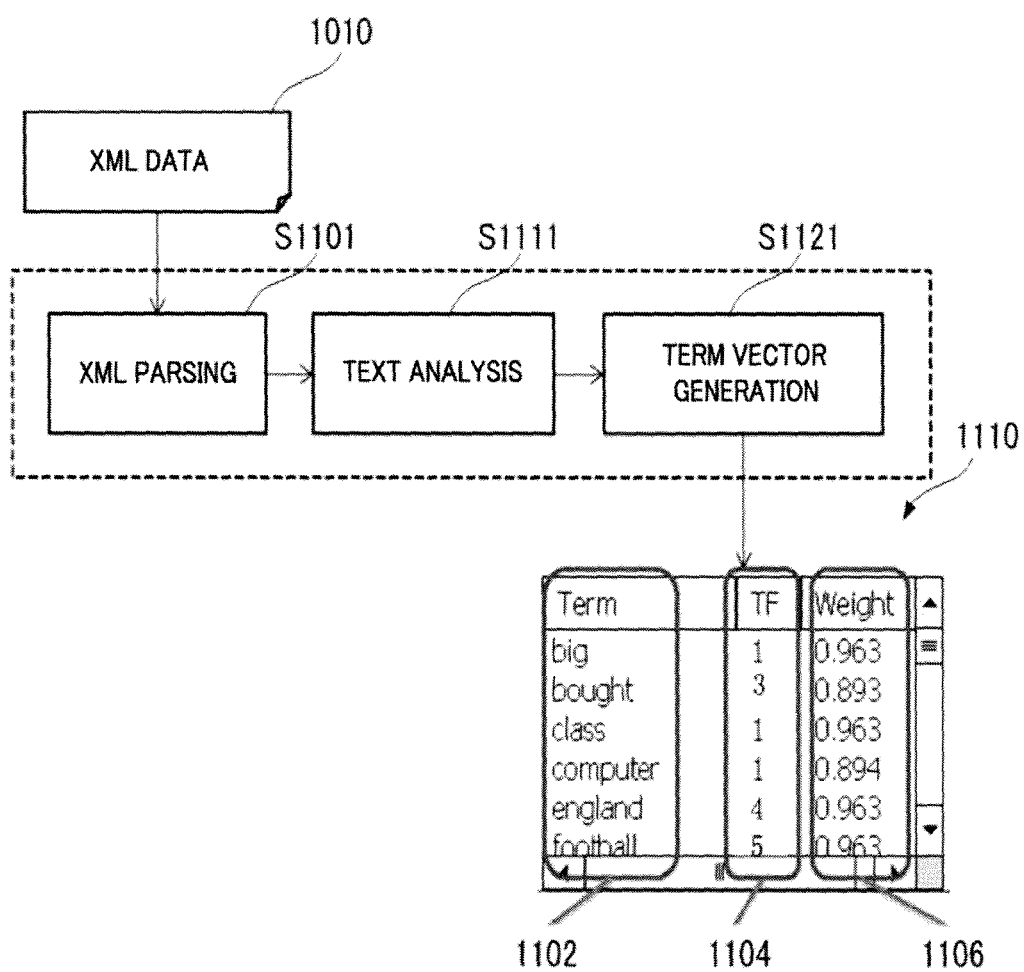
FIG. 11 is a conceptual view showing analyzing text data to generate term vectors in accordance with an illustrative embodiment of the present disclosure.

FIG. 11 is a conceptual view showing analyzing text data and generating term vectors in accordance with an illustrative embodiment of the present disclosure.

The term weight calculation unit 214 may parse the above-described XML data 1010 using an XML parser, and load the results in a memory (S1101 and S1111, respectively). Once the term weight calculation unit 214 analyzes the text data and meta data loaded in the memory, the term vector generation unit 210 may generate a term vector 1110 in a vector space model based on the term weight using the analyzed information (S1121).

The term vector 1110 is a basic classification unit, and may be defined as a vector having the dimension of terms composing the text data with a term weight for each of the terms. As described above, a term weight may include a term frequency and a time weight.

The term frequency indicates the number of times of use 1104 of each term 1102 included in the extracted text data, as illustrated in FIG. 11. This reflects the fact that a term more frequently appearing in the extracted text data is more critical to indicate a user interest. A weight may be assigned to the corresponding term based on types of the extracted text data containing the corresponding term.

The time weight 1106 is a weight based on the generation time of corresponding text data, among the meta data of the text data containing each term. Here, how close the generation time of the text data containing the term is to the current time, when the term vector 1110 is calculated, may be indicated in a range of 0 to 1.

This is to reflect that a term included in lately generated text data is more critical to indicate a user interest. The term vector 1110 may be generated for each type of text data, such as the generation location of the extracted text data or an application program associated with the text data.

Specifically, the term vector generation unit 210 may generate an individual term vector representing each text data based on the type of the text, such as a short message service (SMS)/multimedia messaging service (MMS) text message, a file name, an e-mail, and a mobile web usage history. More than one term vector, representing each text data, for each text data type may be generated depending on the term weight including a term frequency and a time weight.

Returning to FIG. 9, the subject classification tree storage unit 215 stores a subject classification tree, which is a tree structure in which multiple nodes, each including at least one training data and representing a subject, are connected to one another. Since the method for generating the subject classification tree has been described in detail with reference to FIG. 1, descriptions of the method will be omitted here.

The similarity calculation unit 220 calculates the similarity between the term vectors 1110, representing the text data included in the data generated in the mobile communication device, and the training data for each node included in the subject classification tree.

Figure 12:
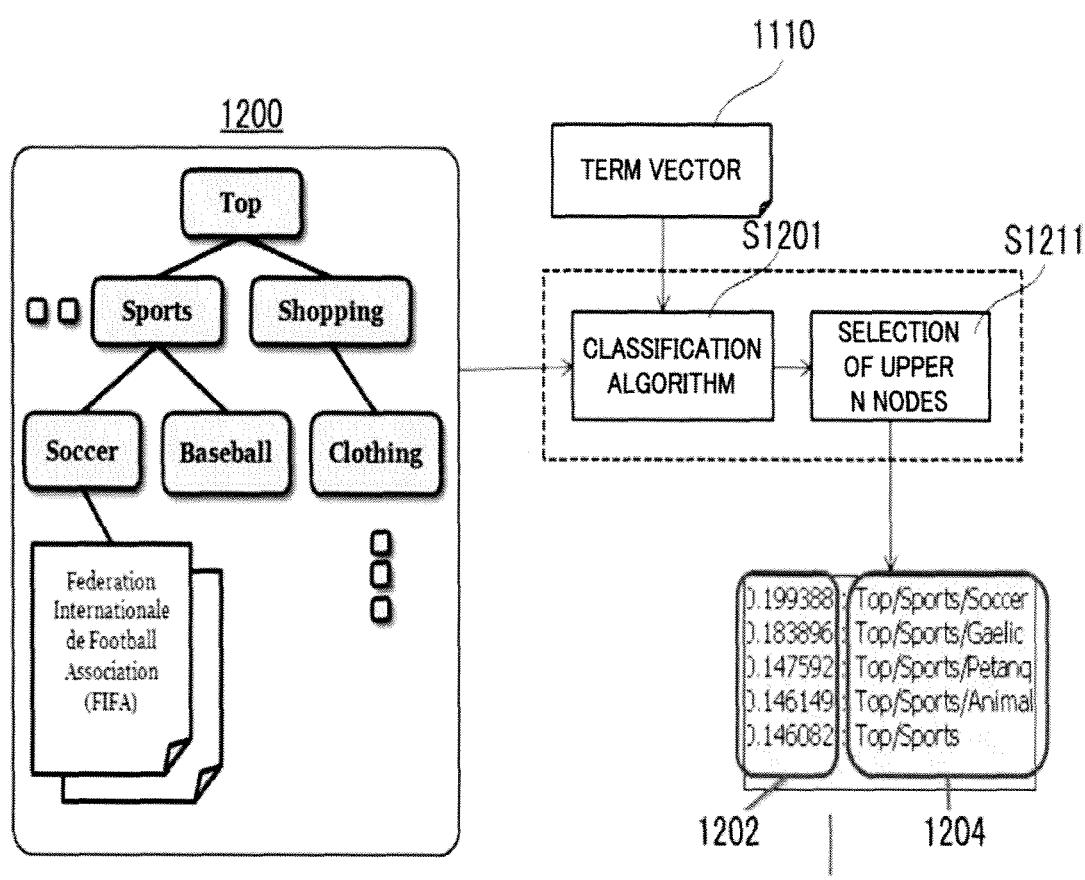
FIG. 12 is a conceptual view showing analyzing text data to extract node names corresponding to a user interest depending on similarity in accordance with an illustrative embodiment of the present disclosure.

FIG. 12 is a conceptual view showing analyzing text data to extract node names corresponding to a user interest depending on similarity in accordance with an illustrative embodiment of the present disclosure.

As illustrated in FIG. 12, the similarity calculation unit 220 maps the term vectors 1110 representing the text data included in the data generated in the portable communication device to the nodes of the subject classification tree 1200 using a classification algorithm (S1201). Here, the classification algorithm may include a support vector machine, a naive Bayesian, K-NN(K-Nearest Neighbor), etc.

The similarity calculation unit 220 calculates the similarity 1202 between a term vector 1110 and the training data of the corresponding node. The similarity calculation unit 220 may calculate the similarity between the term vector 1110 and the training data for each node, and then, based on the similarity 1202, extract the names of N upper nodes 1204 having higher similarities 1202 (S1211). For each node of the subject classification tree 1200, the similarity calculation unit 220 may calculate a parent node's similarity by summing up all its children's similarities.

Then, the similarity calculation unit 220 may extract, as a user interest, the name of the node having the highest similarity value among those upper nodes at the same level in the subject classification tree.

For example, in a subject classification tree 1200 covering from sports to soccer, all the similarity values for sub nodes of the soccer node may be summed up so as to calculate the similarity of the soccer node. Thereafter, if the similarity value of the soccer is the largest upon comparison of the similarity values, the node name "Top/Sports/Soccer" may be extracted as a corresponding user interest.

In accordance with an illustrative embodiment, all similarities at the same level such as soccer and baseball may be summed up to calculate the similarity of their parent node, i.e., the sports node. And, if the similarity value of the sports node is the largest in the nodes at the same level with it, the node name "Top/Sports" may be extracted as the corresponding user interest. As described above, since the user interest is extracted in a node name of the subject classification tree, it is possible to provide security for the user interest.

Returning to FIG. 9, the information storage unit 230 stores programs to implement the present disclosure, algorithm, setting values, information about a tree structure, similarity values for each node, training data information for each node, data type information, information about term vectors, etc.

Figure 13:
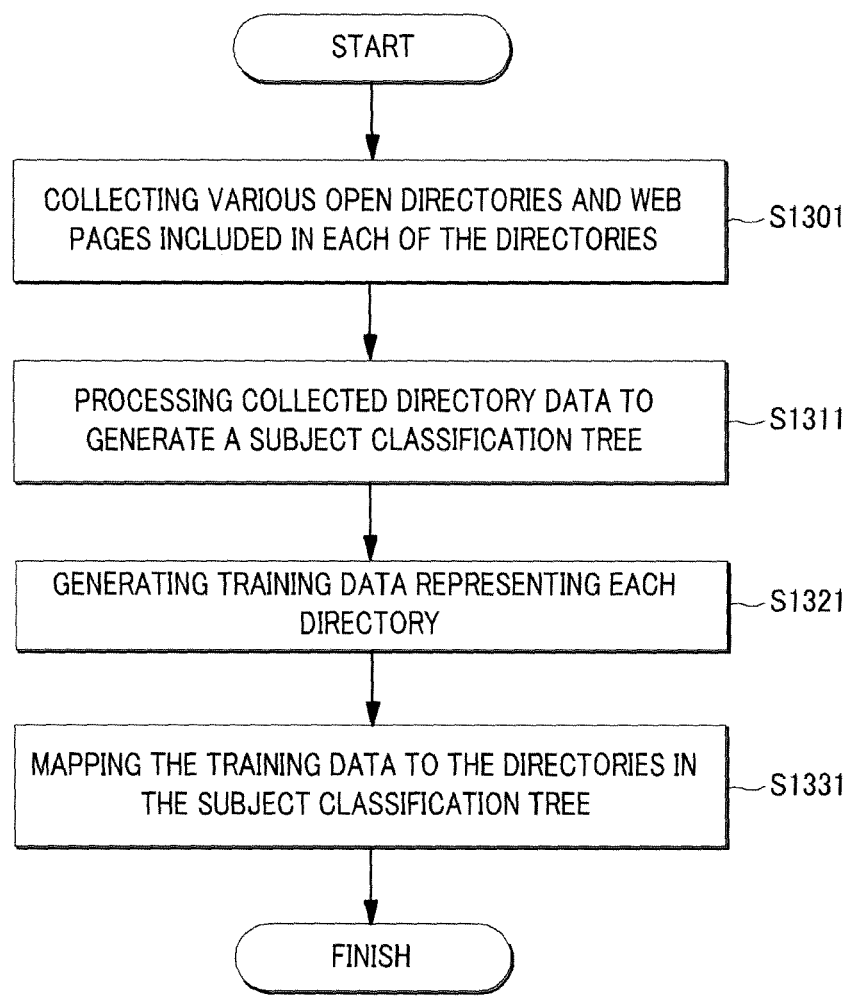
FIG. 13 is a sequence view for generating a subject classification tree in accordance with an illustrative embodiment of the present disclosure.

FIG. 13 is a sequence view for generating a subject classification tree in accordance with an illustrative embodiment.

First, the open directory data collection unit 110 collects various open directories and information about web pages included in each of the directories (S1301). For example, the open directory project (ODP) data or different open directory data posted on various portal sites can be mined.

Next, the subject classification tree generation unit 120 generates the subject classification tree by processing the collected directory data (S1311). In order to generate the subject classification tree, at least one of the aforementioned filtering methods may be selectively used.

Next, the training data generation unit 130 generates training data representing each of the directories based on text data information of web sites included in each of the directories in the collected directory data (S1321). To this end, the training data generation unit 130 converts the text data information of the web pages into term vectors, and then, calculates centroid vectors for the directories based on the term vectors. The training data generation unit 130 then calculates a vector sum of the centroid vectors of child directories and the centroid vector of their parent directory starting from the lowest level directories, so as to calculate the merge centroid vector of each of the parent directories.

Next, the classification unit 140 maps the training data to each directory included in the subject classification tree (S1331). Here, the classification unit 140 may map the calculated merge centroid vectors to the directories included in the subject classification tree.

Figure 14:
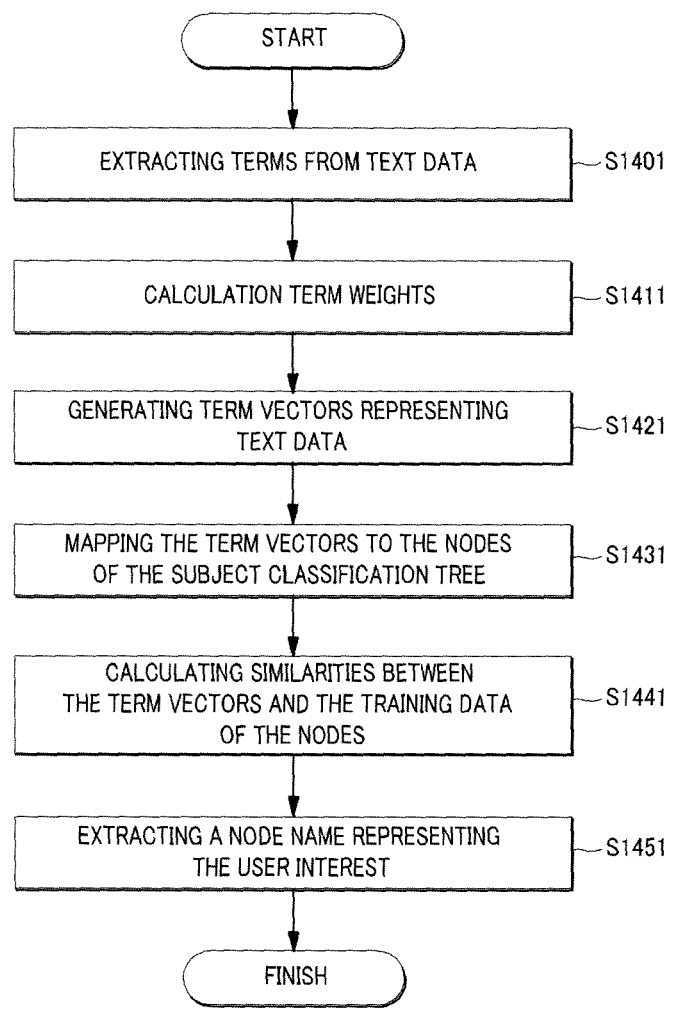
FIG. 14 is a sequence view for extracting node names corresponding to a user interest from a subject classification tree in accordance with an illustrative embodiment of the present disclosure.

FIG. 14 is a sequence view for extracting node names corresponding to a user interest from a subject classification tree in accordance with an illustrative embodiment of the present disclosure.

First, the term extraction unit 212 extracts terms from text data stored in a portable communication device (S1401).

Next, the term weight calculation unit 214 calculates term weights based on the usage frequency of each term in the text data, and the generation time of text data containing the term (S1411).

Next, the term vector generation unit 210, based on the term weight, generates term vectors representing each text data based on types of the text data (S1421).

Next, the similarity calculation unit 220 maps the term vectors to the nodes of the subject classification tree (S1431), and calculates the similarity between the term vector and the training data for each node included in the subject classification tree (S1441).

The similarity calculation unit 220 extracts a node name representing a user interest from the subject classification tree based on the similarity values (S1451).

Here, the similarity calculation unit 220 may extract the name of the node having the highest similarity in the subject classification tree as the user interest. For each node of the subject classification tree, the similarity calculation unit 220 may calculate a parent node's similarity by summing up all its children's similarities, and then, extract the name of the top level node with the highest similarity among the nodes at the same level as the user interest.

Meanwhile, the subject classification tree storage unit 215 and the information storage unit 230 of FIG. 9 may be embodied as at least one of non-volatile memory devices such as a read only memory (ROM), a programmable ROM (PROM), an erasable programmable ROM (EPROM), an electrically erasable programmable ROM (EEPROM), and a flash memory, volatile memory devices such as a random access memory (RAM), and storage mediums such as a hard disk drive (HDD), and a CD-ROM. However, the present disclosure is not limited thereto.

The components illustrated in FIGS. 1 and 9 may be configured by a kind of "modules." The "modules" imply software or hardware such as a field programmable gate array (FPGA) or an on-demand semiconductor (application specific integrated circuit; ASIC). The modules perform predetermined functions. However, the modules are not limited to the software or the hardware. The module may be stored in an addressable storage medium or may be configured to implement one or more processors. The components and functions thereof provided in the modules may be combined with each other or can be divided.

The above description of the illustrative embodiments is provided for the purpose of illustration, and it would be understood by those skilled in the art that various changes and modifications may be made without changing technical conception and essential features of the illustrative embodiments. Thus, it is clear that the above-described illustrative embodiments are illustrative in all aspects and do not limit the present disclosure. For example, each component described to be of a single type can be implemented in a distributed manner. Likewise, components described to be distributed can be implemented in a combined manner.

The scope of the inventive concept is defined by the following claims and their equivalents rather than by the detailed description of the illustrative embodiments. It shall be understood that all modifications and embodiments conceived from the meaning and scope of the claims and their equivalents are included in the scope of the inventive concept.

What is claimed is:

1. A portable communication device for extracting a user interest, the device comprising:
   a term vector generation unit for generating, based on types of text data stored in the portable communication device, a term vector representing each text data;
   a subject classification tree storage unit for storing a subject classification tree, which is a tree structure in which multiple nodes, each including at least one training data and representing a subject, are connected to one another;

a subject classification tree generation unit for generating the subject classification tree by processing open directory data;

a training data generation unit for generating the training data representing each directory based on text data information of a set of web sites included in the each directory of the open directory data;

a classification unit for mapping the training data to a directory included in the subject classification tree; and a similarity calculation unit for calculating a similarity between the term vector and the training data for each node in the subject classification tree, wherein the similarity calculation unit extracts a node name representing the user interest from the subject classification tree based on the similarity.

2. The portable communication device for extracting a user interest of claim 1, wherein the term vector generation unit comprises:

a term extraction unit for extracting terms from the text data; and a term weight calculation unit for calculating a term weight based on usage frequency of each of the terms used in the text data, and generation time of the text data containing the terms.

3. The portable communication device for extracting a user interest of claim 1, wherein the similarity calculation unit calculates the similarity between the term vector and the training data included in each node of the subject classification tree, and for each node of the subject classification tree, a parent node's similarity is calculated by summing up all its children's similarities.

4. The portable communication device for extracting a user interest of claim 1, wherein the name of the node having the highest similarity in the subject classification tree is extracted as the user interest.

5. The portable communication device for extracting a user interest of claim 1, wherein the text data are extracted from at least one of a text message, a file name, an e-mail, and a mobile web usage history generated in the portable communication device.

6. A method for extracting a user interest, the method comprising:

a step in which a term extraction unit extracts terms from text data stored in a portable communication device;

a step in which a term weight calculation unit calculates a term weight based on usage frequency of each of the terms used in the text data, and generation time of the text data containing the terms;

a step in which a term vector generation unit, based on types of text data stored in the portable communication device, generates a term vector representing each text data; and a step in which an open directory data collection unit collects various open directories and information about web pages included in each of the directories;

a step in which a subject classification tree generation unit generates a subject classification tree by processing the collected directory data;

a step in which a training data generation unit generates a training data representing each directory based on text data information of a set of web sites included in the each directory of the collected directory data;

a stage in which a classification unit maps the training data to a directory included in the subject classification tree; and a step in which a similarity calculation unit calculates a similarity between the term vector and the training data for each node included in a subject classification tree, which is a tree structure in which multiple nodes, each including at least one training data and representing a subject, are connected to one another;

wherein the similarity calculation unit extracts a node name representing the user interest from the subject classification tree based on the calculated similarity.

7. The method for extracting a user interest of claim 6, wherein the similarity calculation unit, for each node of the subject classification tree, calculates a parent node's similarity by summing up all its children's similarities.

8. The method for extracting a user interest of claim 6, wherein the similarity calculation unit extracts the name of the node having the highest similarity in the subject classification tree as the user interest.

* * * * *